(12) United States Patent
Miwa (10) Patent No.: US 11,518,195 B2
(45) Date of Patent: Dec. 6, 2022

(54) OFF-ROAD TYRE

(71) Applicant: Sumitomo Rubber Industries, Ltd., Kobe (JP)

(72) Inventor: Takuya Miwa, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 466 days.

(21) Appl. No.: 16/700,667

(22) Filed: Dec. 2, 2019

(65) Prior Publication Data

US 2020/0207156 A1 Jul. 2, 2020

(30) Foreign Application Priority Data

Dec. 28, 2018 (JP) .............................. JP2018-247128

(51) Int. Cl.
*B60C 11/11* (2006.01)
*B60C 11/13* (2006.01)
*B60C 11/01* (2006.01)

(52) U.S. Cl.
CPC ........... *B60C 11/11* (2013.01); *B60C 11/1376* (2013.01); *B60C 2011/013* (2013.01); *B60C 2200/14* (2013.01)

(58) Field of Classification Search
CPC . B60C 11/11; B60C 11/1376; B60C 11/1281; B60C 2200/14; B60C 2200/10; B60C 2011/013
USPC ................................................. D12/500–608
See application file for complete search history.

(56) References Cited

U.S. PATENT DOCUMENTS

| 2012/0024440 A1* | 2/2012 | Ishida .................... B60C 11/11 |
| | | 152/209.1 |
| 2020/0039299 A1* | 2/2020 | Hinami ................... B60C 11/11 |
| 2020/0055348 A1* | 2/2020 | Hikita ................. B60C 11/1369 |

FOREIGN PATENT DOCUMENTS

| EP | 2412547 A1 | 2/2012 |
| EP | 3 323 641 A1 | 5/2018 |
| EP | 3 339 057 A1 | 6/2018 |
| EP | 3 611 037 A1 | 2/2020 |
| JP | 1-273706 A | 11/1989 |
| JP | 2014-184956 A | 10/2014 |

OTHER PUBLICATIONS

Extended European Search Report for European Application No. 19209927.3, dated Jun. 10, 2020.

* cited by examiner

*Primary Examiner* — Katelyn W Smith
*Assistant Examiner* — Philip N Schwartz
(74) *Attorney, Agent, or Firm* — Birch, Stewart, Kolasch & Birch, LLP (57) ABSTRACT

An off-road tyre includes a tread portion being provided on a tread edge side with shoulder blocks arranged in a tyre circumferential direction. The shoulder blocks include at least one first shoulder block and at least one second shoulder block having a circumferential length greater than that of the at least one first shoulder block. The at least one first shoulder block includes a first ground contact surface, a second ground contact surface protruding outwardly from the first ground contact surface in a block height direction, and a first shallow groove extending between the first ground contact surface and the second ground contact surface.

14 Claims, 7 Drawing Sheets

OFF-ROAD TYRE

BACKGROUND ART

Field of the Disclosure

The present disclosure relates to an off-road tyre.

Description of the Related Art

The following Patent document 1 discloses an off-road pneumatic tyre which includes a tread portion provided with a plurality of shoulder blocks on a tread edge side. The plurality of shoulder blocks is provided with a cut which includes a pair of first sipes extending inwardly toward the block center from a block edge and a second sipe connecting the pair of first sipes. Thus, the plurality of shoulder blocks comprises a main portion defined outwardly of the cut and an auxiliary portion defined inwardly of the cut.

PATENT DOCUMENT

Patent Document 1

Japanese Unexamined Patent Application Publication 2014-184956

SUMMARY OF THE DISCLOSURE

Due to recent improvements in performance of vehicles, opportunity for such an off-road tyre to travel not only off-road conditions such as muddy roads and the like but also hard road surface conditions such as dry asphalt roads, compressed-soil roads and the like has been increased. Thus, it has been required for off-road tyres to exhibit superior steering stability on both off-road conditions and hard road surface conditions.

The present disclosure has been made in view of the above problem and has a major object to provide an off-road tyre capable of improving steering stability on both off-road conditions and hard road surface conditions in a well-balanced manner.

According to one aspect of the disclosure, an off-road tyre includes a tread portion being provided on a tread edge side with shoulder blocks arranged in a tyre circumferential direction, the shoulder blocks including at least one first shoulder block and at least one second shoulder block having a circumferential length greater than that of the at least one first shoulder block, wherein the at least one first shoulder block includes a first ground contact surface, a second ground contact surface protruding outwardly from the first ground contact surface in a block height direction, and a first shallow groove extending between the first ground contact surface and the second ground contact surface.

In another aspect of the present disclosure, the at least one second shoulder block may include a third ground contact surface, a fourth ground contact surface protruding outwardly from the third ground contact surface in a block height direction, and a second shallow groove extending between the third ground contact surface and the fourth ground contact surface.

In another aspect of the present disclosure, the at least one second shoulder block may include a circumferentially extending axially inner block edge, and the second shallow groove may include two lateral groove portions extending outwardly in a tyre axial direction from the inner block edge and a longitudinal groove portion connecting axially outer ends of the lateral groove portions.

In another aspect of the present disclosure, the at least one second shoulder block may include a circumferentially extending axially outer block edge, and a length in the tyre circumferential direction of the inner block edge may be smaller than a length in the tyre circumferential direction of the outer block edge.

In another aspect of the present disclosure, each of the lateral groove portions of the at least one second shoulder block may include a first portion extending from the inner block edge, and a second portion connected to the first portion and having a greater width than that of the first portion.

In another aspect of the present disclosure, in the at least one second shoulder block, the third ground contact surface may be defined outside in the tyre circumferential and axial directions of the second shallow groove, and block widths of portions of the third ground contact surface which are adjacent to the second portions of the lateral groove portions in the tyre circumferential direction may be greater than a block width of a portion of the third ground contact surface which is adjacent to the longitudinal groove portion in the tyre axial direction, but may be equal to or less than 3.0 times the block width of a portion of the third ground contact surface which is adjacent to the longitudinal groove portion in the tyre axial direction.

In another aspect of the present disclosure, in the at least one second shoulder block, the fourth ground contact surface may be defined inside in the tyre circumferential and axial directions of the second shallow groove, and the inner block edge of the fourth ground contact surface may extend in parallel with the tyre circumferential direction.

In another aspect of the present disclosure, in the at least one second shoulder block, the third ground contact surface may be defined outside in the tyre circumferential and axial directions of the second shallow groove, and a block width of a portion of the third ground contact surface which is adjacent to the longitudinal groove portion in the tyre axial direction may be in a range of from 0.1 to 0.4 times an axial length of the second shoulder block.

In another aspect of the present disclosure, a length in a tyre axial direction of the fourth ground contact surface may be equal to or more than 0.2 times a length in the tyre axial direction of the second shoulder block.

In another aspect of the present disclosure, a block height of the fourth ground contact surface may be equal to or less than 1.2 times a block height of the third ground contact surface.

In another aspect of the present disclosure, a groove depth of the second shallow groove may be in a range of from 0.010 to 0.35 times a block height of the third ground contact surface.

In another aspect of the present disclosure, a number of the at least one first shoulder block may be greater than a number of the at least one second shoulder block.

In another aspect of the present disclosure, a number of the at least one second shoulder block may be less than 0.5 times a number of the at least one first shoulder block.

In another aspect of the present disclosure, a length in the tyre circumferential direction of the at least one second shoulder block may be equal to or less than 2.0 times a length in the tyre circumferential direction of the at least one first shoulder block.

In another aspect of the present disclosure, a length in a tyre axial direction of the at least one second shoulder block may be greater than a length in a tyre axial direction of the at least one first shoulder block, but is equal to or less than 1.30 times the length in a tyre axial direction of the at least one first shoulder block.

DESCRIPTION OF THE PREFERRED EMBODIMENTS

An embodiment of the present disclosure will be explained below with reference to the accompanying drawings.

Figure 1:
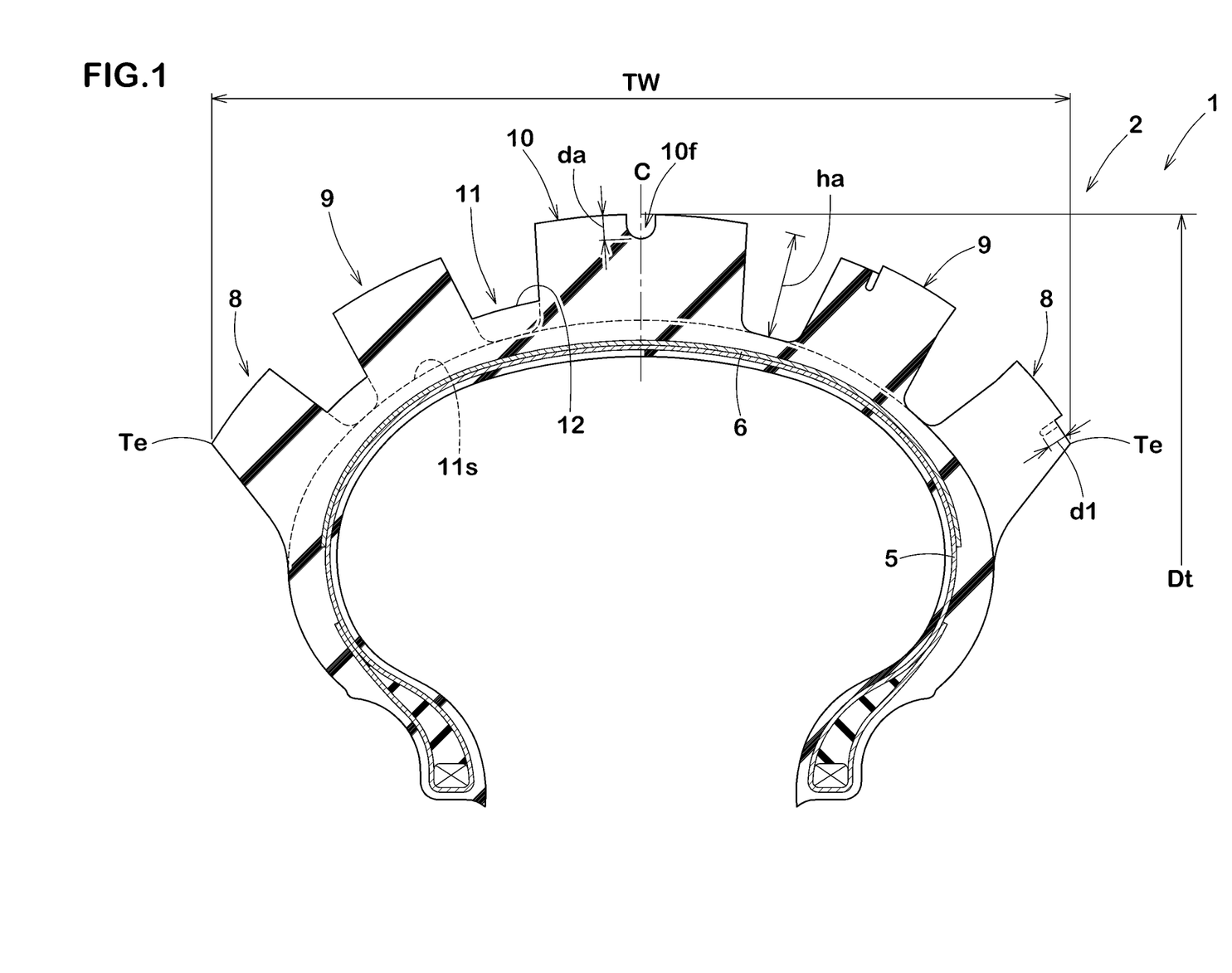
FIG. 1 is a cross-sectional view of an off-road tyre in accordance with an embodiment of the disclosure.

FIG. 1 illustrates a cross-sectional view of an off-road tyre (hereinafter, simply may be referred to as "tyre") 1 under a normal state in accordance with an embodiment of the disclosure.

In the present embodiment, a motorcycle tyre is exemplified. Note that the present disclosure is not limited to a motorcycle tyre but can be applicable to other categories of tyres which are directed to, for example, a passenger car, a heavy-duty vehicle and the like.

As used herein, the "normal state" is such that the tyre 1 is mounted on a standard wheel rim (not illustrated) with a standard pressure but loaded with no tyre load.

As used herein, unless otherwise noted, dimensions of the respective portions of tyre 1 are values measured under the normal state.

The "standard wheel rim" is a wheel rim officially approved for each tyre by standards organizations on which the tyre is based, wherein the standard wheel rim is the "standard rim" specified in JATMA, the "Design Rim" in TRA, and the "Measuring Rim" in ETRTO, for example.

The "standard pressure" is a standard pressure officially approved for each tyre by standards organizations on which the tyre is based, wherein the standard pressure is the "maximum air pressure" in JATMA, the maximum pressure given in the "Tyre Load Limits at Various Cold Inflation Pressures" table in TRA, and the "Inflation Pressure" in ETRTO, for example.

As illustrated in FIG. 1, the tyre 1 according to the present embodiment includes a tread portion 2 which, in a cross-sectional view, is curved such that an outer surface thereof protrudes outwardly in the tyre radial direction in an arc-shape manner.

The tyre 1 according to the present embodiment includes a carcass 5 and a belt layer 6, for example. As these construction elements, conventional structures may be employed.

Figure 2:
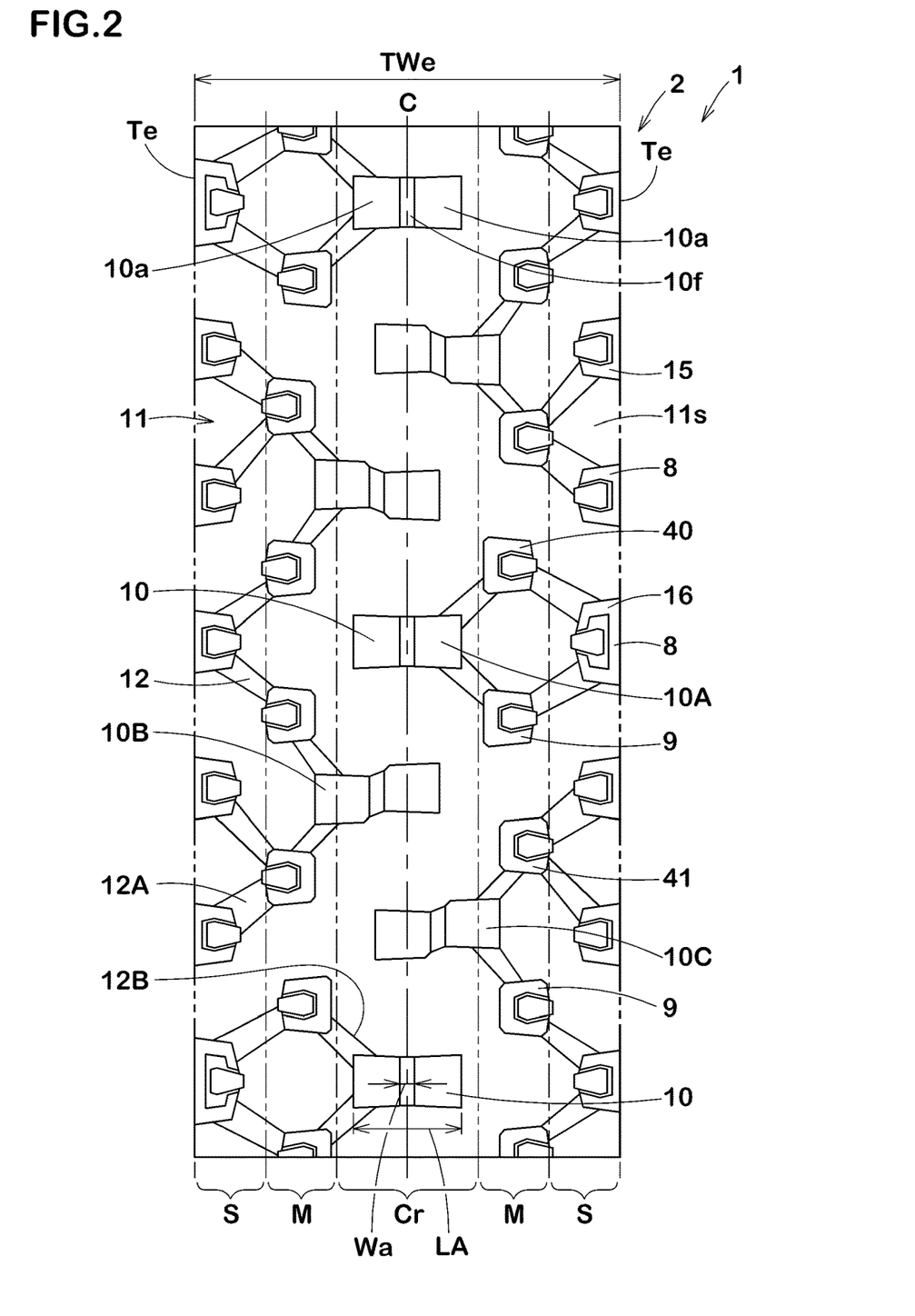
FIG. 2 is a development view of a tread portion of FIG. 1.

FIG. 2 illustrates a development view of the tread portion 2 of the tyre 1 according to the present embodiment. It is noted that the tread pattern is not limited to the aspect as shown in FIG. 2. As illustrated in FIG. 2, the tread portion 2 includes a crown region Cr including the tyre equator C, two middle regions M between which the crown region Cr is located, and two shoulder regions S between which the middle regions M are located. Each shoulder region S, for example, is a region having a one sixth development width of a tread development width TWe from a respective one of tread edges Te. Each middle region M, for example, is a region having a one sixth development width of the tread development width TWe from a respective one of the shoulder regions S.

The tread development width TWe is an axial distance between the tread edges Te when the tread portion 2 is developed on a plane. The tread edges Te are defined as axially outermost ground contacting edges of the tread portion 2.

The tread portion 2 according to the present embodiment is provided with a plurality of shoulder blocks 8 arranged in the tyre circumferential direction on the tread edge Te side of each shoulder region S. Large lateral force may be applied on or around either one of the tread edges Te when cornering. Thus, the plurality of shoulder blocks 8 arranged in the tyre circumferential direction can be useful to deliver stable cornering.

The tread portion 2 according to the present embodiment is provided with tread grooves 11 to define the shoulder blocks 8, middle blocks 9 and the crown blocks 10. These blocks 8 to 10 raise from a bottom 11s of the tread grooves 11.

The shoulder blocks 8 according to the present embodiment include at least one first shoulder block 15 and at least one second shoulder block 16 having a circumferential length greater than that of the first shoulder block 15. The second shoulder block 16 increases friction force on hard road surface conditions, resulting in exerting powerful traction when cornering. Thus, the second shoulder block 16 can be useful to improve steering stability on hard road surface conditions.

Figure 3:
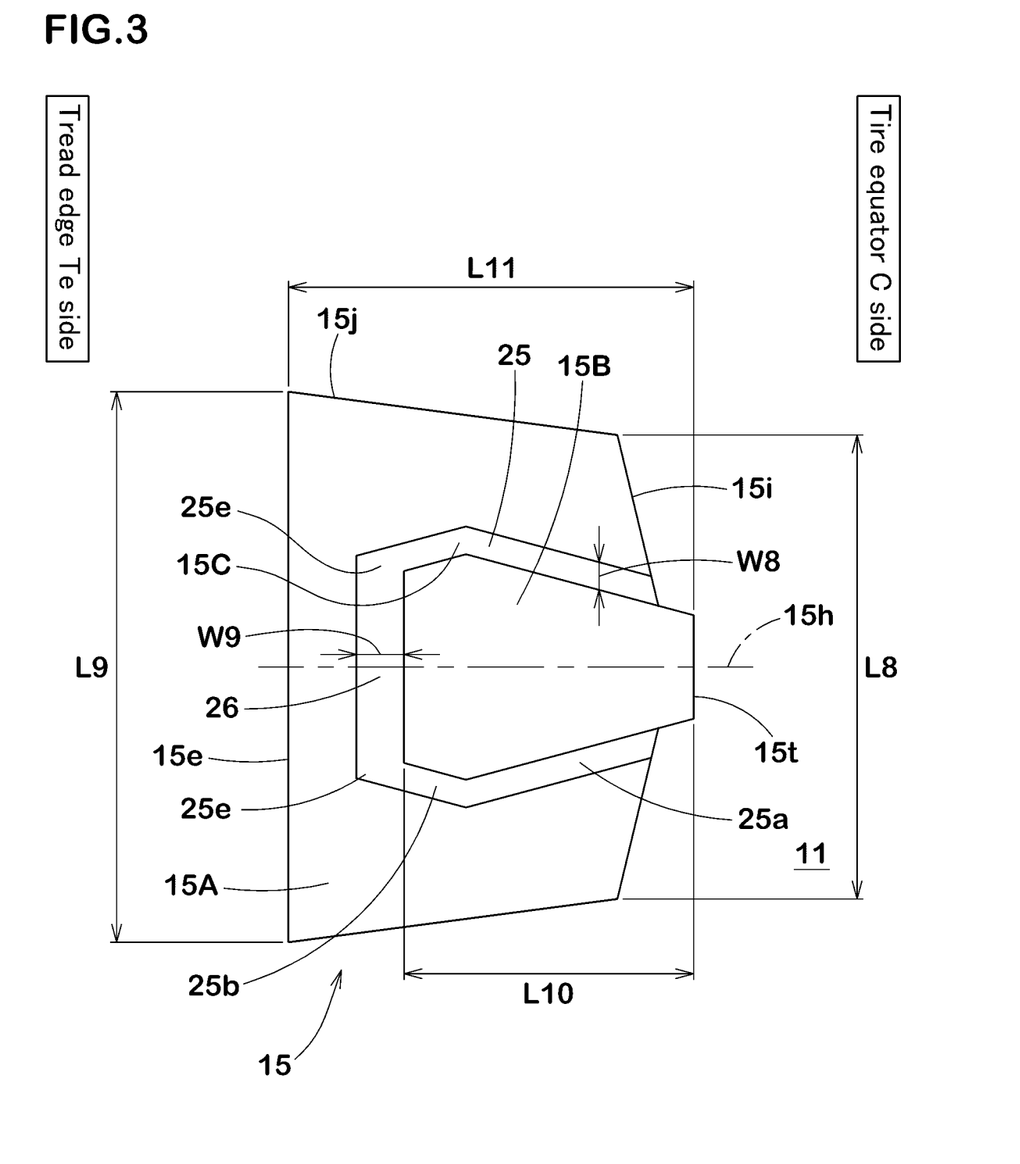
FIG. 3 is an enlarged view of a first shoulder block of FIG. 2.

FIG. 3 illustrates an enlarged view of the first shoulder block 15. As illustrated in FIG. 3, the first shoulder block 15 includes a first ground contact surface 15A, a second ground contact surface 15B protruding outwardly from the first ground contact surface 15A in the block height direction, and a first shallow groove 15C extending between the first ground contact surface 15A and the second ground contact surface 15B. Such a second ground contact surface 15B tends to dig into off-road surface and to increase ground contacting pressure, generating powerful traction. Further, the first shallow groove 15C, the first ground contact surface 15A and the second ground contact surface 15B which are different in height can increase an edge length. Thus, steering stability on off-road conditions can be improved. Therefore, the tyre 1 according to the present embodiment can improve steering stability on both off-road conditions and hard road surface conditions in a well-balanced manner.

Figure 4:
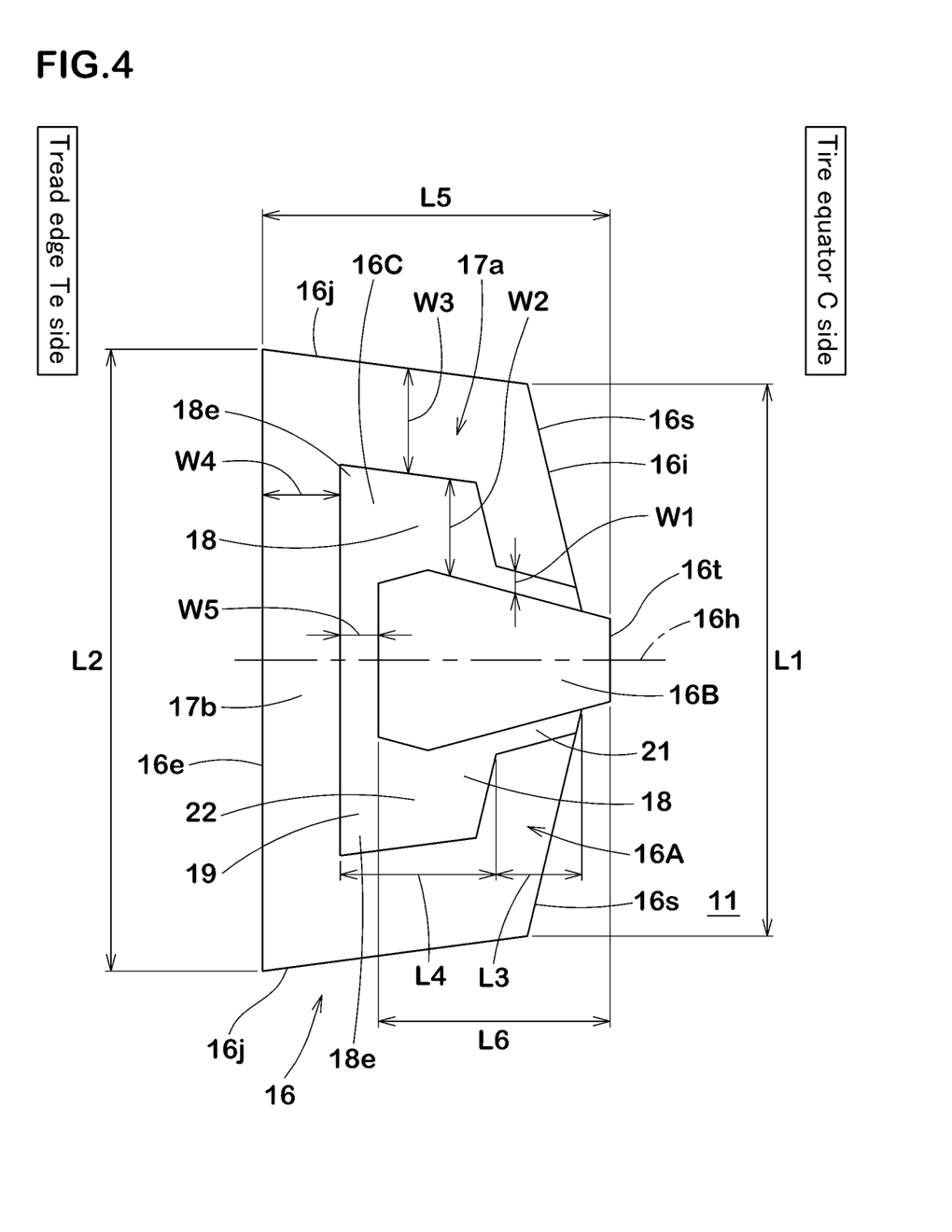
FIG. 4 is an enlarged view of a second shoulder block of FIG. 2.
Figure 5A:
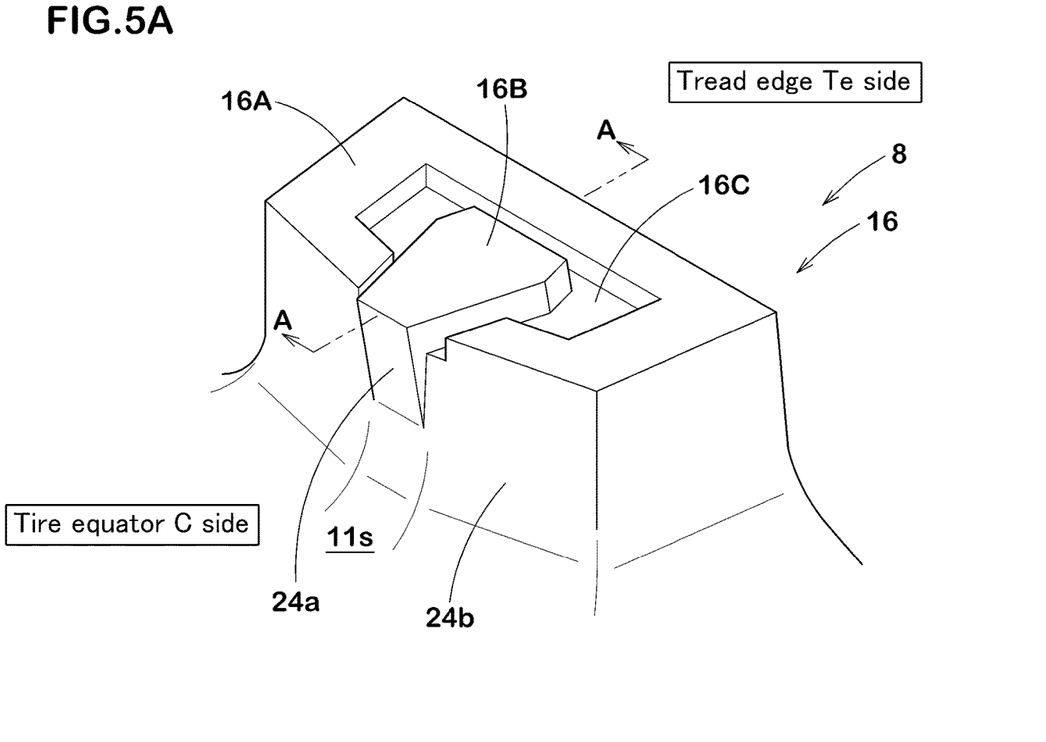
FIG. 5A is a perspective view of the second shoulder block of FIG. 2.
Figure 5B:
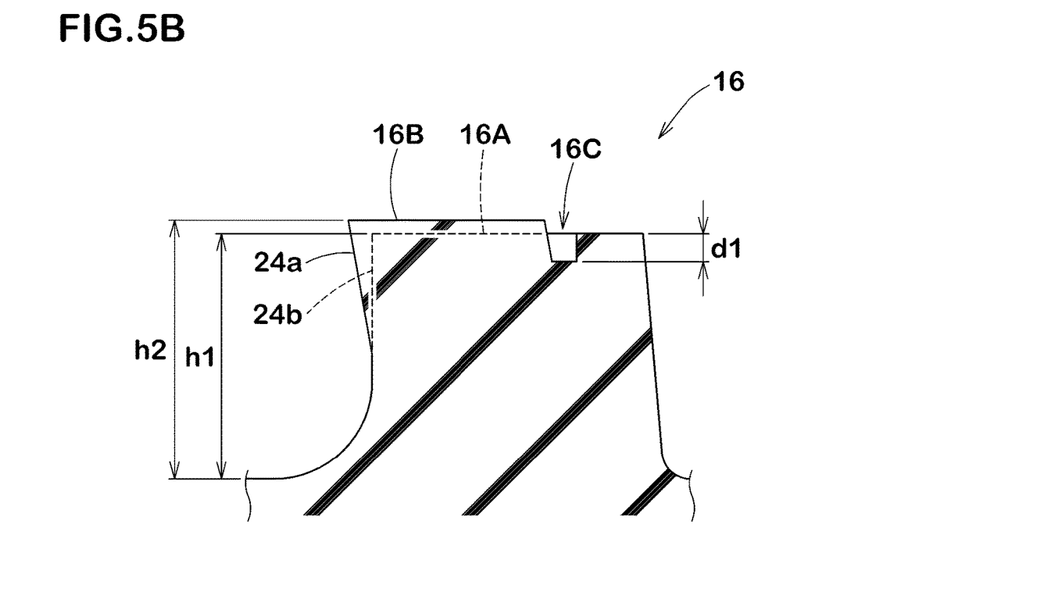
FIG. 5B is a cross-sectional view taken along line A-A of FIG. 5A.

FIG. 4 illustrates an enlarged view of the second shoulder block 16. FIG. 5A illustrates a perspective view of the second shoulder block 16, and FIG. 5B is a cross-sectional view taken along line A-A of FIG. 5A. As illustrated in FIG. 4, FIG. 5A and FIG. 5B, the second shoulder block 16 includes a third ground contact surface 16A, a fourth ground contact surface 16B protruding outwardly from the third ground contact surface 16A in the block height direction, and a second shallow groove 16C extending between the third ground contact surface 16A and the fourth ground contact surface 16B. Such a second shoulder block 16 can also improve steering stability on off-road conditions. Thus, the tyre 1 for traveling on off-road conditions according to the present embodiment which includes the first shoulder block 15 and the second shoulder block 16 can exhibit superior steering stability on off-road conditions.

The second shoulder block 16 according to the present embodiment has a line symmetrical shape with respect to an axial line 16h which passes through the circumferential center location of the second shoulder block 16. The second shoulder block 16, in the present embodiment, has a substantially pentagonal shape. Note that the shape of the second shoulder block 16 is not limited to the above aspect.

The third ground contact surface 16A, in the present embodiment, is configured in a C-shaped manner (or an inverse C-shaped manner). The fourth ground contact surface 16B, in the present embodiment, has a hexagonal shape whose maximum circumferential length location is positioned axially outwardly of the axial center location of the fourth ground contact surface 16B. Note that shapes of the third ground contact surface 16A and the fourth ground contact surface 16B are not limited to the above aspects.

The second shoulder block 16, in the present embodiment, includes an axially inner block edge 16i extending in the tyre circumferential direction, and an axially outer block edge 16e extending in the tyre circumferential direction.

The inner block edge 16i, in the present embodiment, includes a pair of end portions 16s formed on the third ground contact surface 16A, and a middle portion 16t formed on the fourth ground contact surface 16B.

The middle portion 16t, in the present embodiment, extends in parallel with the tyre circumferential direction. Such a middle portion 16t may be helpful to enhance axial stiffness of the fourth ground contact surface 16B. The end portions 16s, in the present embodiment, are inclined with respect to the tyre circumferential direction. The end portions 16s, for example, extends to the tyre equator C side from circumferential both ends thereof toward the circumferential center location of the second shoulder block 16. Such end portions 16s can be helpful to guide mud and the like toward the tread edge Te side smoothly.

A length L1 in tyre circumferential direction of the inner block edge 16i is smaller than a length L2 in the tyre circumferential direction of the outer block edge 16e. This structure may be helpful to enhance stiffness of the second shoulder block 16 on the tread edge side Te to which large lateral force applies, thus increasing friction force.

It is preferable that the length L1 in the tyre circumferential direction of the inner block edge 16i is equal to or more than 0.5 times the length L2 in the tyre circumferential direction of the outer block edge 16e. Thus, stiffness of the second shoulder block 16 on the tyre equator C side may be ensured. In order to improve the effect that releases mud and soil smoothly and friction force on hard road surface conditions in a well-balanced manner, it is preferable that the length L1 in the tyre circumferential direction of the inner block edge 16i is in a range of from 0.78 to 0.97 times the length L2 in the tyre circumferential direction of the outer block edge 16e.

The second shoulder block 16, for example, includes two block edges 16j which extends in the tyre circumferential direction on the respective circumferential end portions of the block. The block edges 16j, in the present embodiment, are inclined outwardly in the tyre circumferential direction of the second shoulder block 16 toward the tread edge Te. When one of the block edges 16j corresponds to a heel-side edge of the second shoulder block 16, it can scratch the ground and discharge mud and the like outside the tread edge Te when cornering with a camber angle and a slip angle. Alternatively, when one of the block edges 16j corresponds to a heel-side edge of the second shoulder block 16, it can gather mud effectively when braking. Furthermore, the block edges 16j can enhance stiffness of the second shoulder block 16 on the tread edge Te side. Thus, the block edges 16j according to the present embodiment can improve steering stability.

The second shallow groove 16C includes two lateral groove portions 18 extending outwardly in the tyre axial direction from the inner block edge 16i, and a longitudinal groove portion 19 connecting axially outer ends 18e of the lateral groove portions 18. The second shallow groove 16C increases edge component lengths in the tyre axial and circumferential directions. In the present embodiment, the third ground contact surface 16A is separated from the fourth ground contact surface 16B by two lateral groove portions 18 and the longitudinal groove portion 19. Note that the second shallow groove 16C is not limited to such an aspect.

Each lateral groove portion 18, in the present embodiment, includes a first portion 21 extending from the inner block edge 16i, and a second portion 22 connected to the first portion 21 and having a groove width greater than that of the first portion 21. The longitudinal groove portion 19, in the present embodiment, extends straight in a constant groove width which is measured in parallel with the tyre axial direction. The lateral groove portions 18 can mitigate stiffness of the second shoulder block 16 appropriately, improving ground contacting feeling on hard road surface conditions and vibration absorbing property. Further, the second portions 22 of the lateral groove portions 18 can improve scratching effect and facilitate deformation of the fourth ground contact surface 16B, discharging smoothly mud and the like in the second shallow groove 16C located outwardly of the fourth ground contact surface 16B.

It is preferable that the groove width W1 of each first portion 21 which is measured in parallel with the tyre circumferential direction is in a range of from 15% to 35% of the groove width W2 of each second portion 22 which is measured in parallel with the tyre circumferential direction. Such lateral groove portions 18 can balance stiffness of a portion of the third ground contact surface 16A adjacent to each first portion 21 in the tyre circumferential direction with stiffness of a portion of the third ground contact surface 16A adjacent to each second portion 22 in the tyre circumferential direction, exerting powerful friction force on hard road surface conditions.

It is preferable that a length L3 in the tyre axial direction of each first portion 21 is smaller than a length L4 in the tyre axial direction of each second portion 22. Thus, the second portion 22 can generate powerful traction on mud. Further, stiffness of the second shoulder block 16 is mitigated appropriately, improving ground contacting feeling and vibration absorbing property.

Although it is not particularly limited, a length L3 in the tyre axial direction of each first portion 21 is preferably in a range of from 60% to 90% of a length L4 in the tyre axial direction of each second portion 22. This can improve the above effect effectively.

The second shoulder block 16 according to the present embodiment includes two first block portions 17a and a second block portion 17b. Each first block portion 17a is a portion of the third ground contact surface 16A which is adjacent to a respective one of the second portions 22 in the tyre circumferential direction. The second block portion 17b is a portion of the third ground contact surface 16A which is adjacent to the longitudinal groove portion 19. In the present embodiment, a block width W3 of each first block portion 17a which is measured in parallel with the tyre circumferential direction is greater than a block width W4 of the second block portion 17b which is measured in parallel with the tyre axial direction. Such a second shoulder block 16 can generate high friction force when cornering, exerting powerful traction.

It is preferable that the block width W3 of each first block portion 17a is equal to or less than 3.0 times the block width W4 of the second block portion 17b. When the block width W3 of each first block portion 17a exceeds 3.0 times the block width W4 of the second block portion 17b, there is a risk that ground contacting feeling as well as steering stability is deteriorated due to reduction in balance of stiffness in the tyre axial and circumferential directions of the second shoulder block 16. From the above viewpoint, the block width W3 of each first block portion 17a is preferably in a range of from 1.2 to 2.5 times the block width W4 of the second block portion 17b.

It is preferable that the block width W4 of the second block portion 17b is in a range of from 0.1 to 0.4 times a length L5 in the tore axial direction of the second shoulder block 16. Thus, stiffness of the second shoulder block 16 can be ensured appropriately, improving mud discharging property due to deformation of the fourth ground contact surface 16B, ground contacting feeling, and steering stability in a well-balanced manner. From the above viewpoint, the block width W4 of the second block portion 17b is preferably in a range of from 0.15 to 0.35 times the length L5 in the tyre axial direction of the second shoulder block 16.

It is preferable that a groove width W5 of the longitudinal groove portion 19 which is measured in parallel with the tyre axial direction is in a range of from 5% to 15% of the length L5 in the tyre axial direction of the second shoulder block 16. Such a longitudinal groove portion 19 can facilitate deformation of the fourth ground contact surface 16B, discharging mud and the like smoothly while preventing an excessive reduction in stiffness in the tyre axial direction of the second shoulder block 16.

It is preferable that a length L6 in the tyre axial direction of the fourth ground contact surface 16B is equal to or more than 0.2 times the length L5 in the tyre axial direction of the second shoulder block 16. This structure makes it possible to ensure sufficient stiffness of the fourth ground contact surface 16B which results in discharging mud and the like smoothly. In order to further improve the above effect, it is further preferable that the length L6 in the tyre axial direction of the fourth ground contact surface 16B is in a range of from 0.5 to 0.8 times the length L5 in the tyre axial direction of the second shoulder block 16.

As illustrated in FIG. 5B, it is preferable that a block height h2 of the fourth ground contact surface 16B is equal to or less than 1.2 times a block height h1 of the third ground contact surface 16A. This can prevent excessive deformation of the fourth ground contact surface 16B, thus preventing it from chipping and cracking. In order to further improve the above effect, it is preferable that the block height h2 of the fourth ground contact surface 16B is in a range of from 1.05 to 1.10 times the block height h1 of the third ground contact surface 16A.

It is preferable that a groove depth d1 of the second shallow groove 16C is in a range of from 0.010 to 0.35 times the block height h1 of the third ground contact surface 16A. When the groove depth d1 is less than 0.010 times the block height h1, there is a risk that ground contacting feeling as well as vibration absorbing property is deteriorated. Further, deformation of the fourth ground contact surface 16B may be suppressed which deteriorates smooth release of mud and the like. When the groove depth d1 exceeds 0.35 times the block height h1, stiffness of the second shoulder block 16 tends to decrease excessively. From the above viewpoint, the groove depth d1 of the second shallow groove 16C is preferably in a range of from 0.030 to 0.30 times the block height h1 of the third ground contact surface 16A.

The second shoulder block 16 includes a first block wall 24a extending toward the bottom 11s from the fourth ground contact surface 16B, and a second block wall 24b extending inwardly in the tyre radial direction from the third ground contact surface 16A. In the present embodiment, the first block wall 24a protrudes outwardly of the second shoulder block 16 from the second block wall 24b. Such a second shoulder block 16 can improve shearing force on off-road conditions.

As illustrated in FIG. 4, it is preferable that the maximum length in the tyre circumferential direction of the second shoulder block 16, e.g., corresponding to the length L2, is in a range of from 0.010 to 0.10 times, more preferably of from 0.03 to 0.08 times an outer tyre diameter Dt (shown in FIG. 1). Further, it is preferable that the length L5 in the tyre axial direction is in a range of from 0.050 to 0.3 times, more preferably 0.1 to 0.2 times a tyre overall width TW (shown in FIG. 1). Furthermore, it is preferable that the block height h1 of the third ground contact surface 16A is in a range of from 0.01 to 0.06 times, more preferably 0.01 to 0.05 times the outer tyre diameter Dt. As used herein, the "tyre overall width TW" shall mean the maximum width in the tyre axial direction of the tyre under the normal state. In the present embodiment, the tyre overall width TW corresponds to a length in the tyre axial direction between the tread edges Te.

Figure 6A:
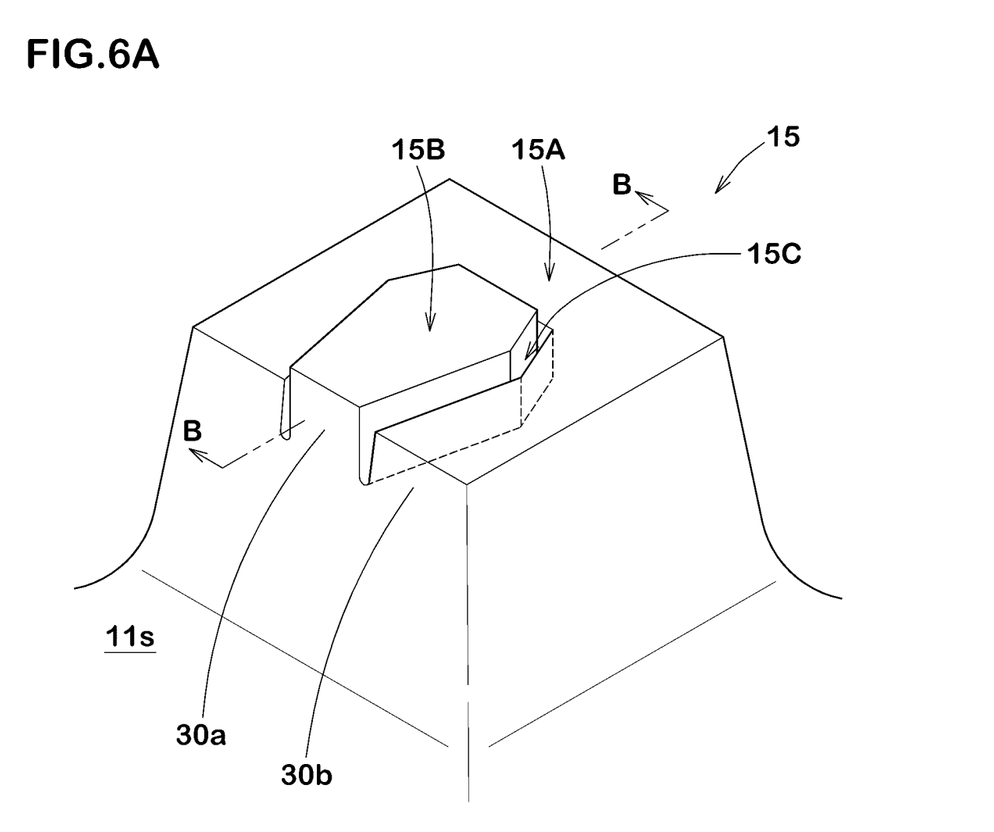
FIG. 6A is a perspective view of the first shoulder block of FIG. 2.
Figure 6B:
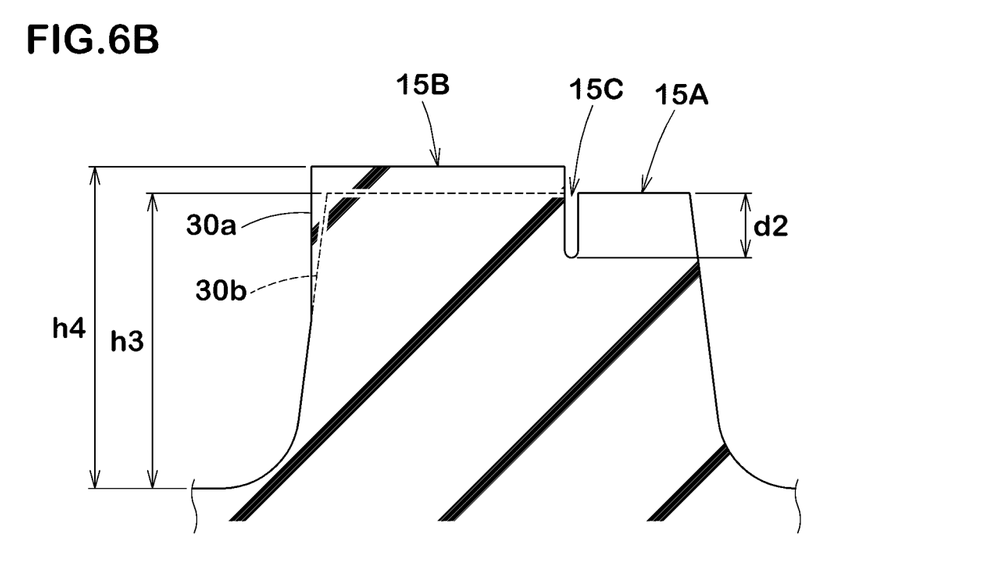
FIG. 6B is a cross-sectional view taken along line B-B of FIG. 6A.

FIG. 6A illustrates a perspective view of the first shoulder block 15, and FIG. 6B illustrates a cross-sectional view taken along line B-B of FIG. 6A. As illustrated in FIG. 3, FIG. 6A and FIG. 6B, the first shoulder block 15 according to the present embodiment is configured as a line symmetrical manner with respect to an axial line 15h which passes through the center location in the tyre circumferential direction of the block. The first shoulder block 15, in the present embodiment, has a substantially pentagonal shape. Note that the shape of first shoulder block 15 is not limited to the above aspect.

The first ground contact surface 15A, in the present embodiment, has a lateral U-shaped manner. The second ground contact surface 15B, in the present embodiment, has a substantially hexagonal shape whose maximum circumferential length location is positioned toward the tread edge Te with respect to the axial center location thereof. Note that shapes of the first ground contact surface 15A and the second ground contact surface 15B are not limited to the above aspects.

The first shoulder block 15, for example, includes a first inner block edge 15i which extends in the tyre circumferential direction on an axially inner side of the block, and a first outer block edge 15e which extends in the tyre circumferential direction on an axially outer side of the block.

The first inner block edge 15i, in the present embodiment, includes a first central portion 15t forming an edge of the second ground contact surface 15B. The first central portion 15t, in the present embodiment, extends in parallel with the tyre circumferential direction. Such a first central portion 15t can provide the second ground contact surface 15B with high stiffness in the tyre axial direction.

A length L8 in the tyre circumferential direction of the first inner block edge 15i is smaller than a length L9 in the tyre circumferential direction of the first outer block edge 15e. Thus, stiffness of the first shoulder block 15 on the tread edge Te side where large lateral force applies can be enhanced.

The first shoulder block 15, for example, includes two first block edges 15j which extends in the tyre axial direction on the respective circumferential end portions of the block. The first block edges 15j, in the present embodiment, are inclined outwardly in the tyre circumferential direction of the first shoulder block 15 toward the tread edge Te. Such a first block edges 15j can discharge mud and soil in the tread grooves 11 toward the tread edge Te smoothly when cornering.

The first shallow groove 15C includes two lateral groove portions 25 extending outwardly in the tyre axial direction from the first inner block edge 15i and a longitudinal groove portion 26 connecting outer ends 25e of the lateral groove portions 25. In the present embodiment, the first ground contact surface 15A is separated from the second ground contact surface 15B by two lateral groove portions 25 and the longitudinal groove portion 26. Note that the first shallow groove 15C is not limited to such an aspect but can be modified so as to extend in a wavy or zigzag manner, for example.

Each lateral groove portion 25, in the present embodiment, includes a third portion 25a and a fourth portion 25b. The third portion 25a extends outwardly in the tyre circumferential direction from the first inner block edge 15i of the first shoulder block 15. The fourth portion 25b is connected to the third portion 25a, and is inclined in an opposite direction to that of the third portion 25a. The lateral groove portions 25, for example, has a constant groove width W8 measured in parallel with the tyre circumferential direction. The longitudinal groove portion 26, in the present embodiment, extends straight with a constant groove width W9 measured in parallel with the tyre axial direction. Such a first shallow groove 15C increases edge lengths thereof in both tyre circumferential and axial directions.

The groove width W8 of each lateral groove portion 25 is smaller than the groove width W9 of the longitudinal groove portion 26. Thus, the second ground contact surface 15B is promoted to deform in the tyre axial direction as compared to in the tyre circumferential direction, enabling to discharge smoothly mud and the like in the tread groove 11 located inwardly in the tyre axial direction of the second ground contact surface 15B. Further, high stiffness of the first shoulder block 15 in the tyre circumferential direction can be maintained.

It is preferable that a length L10 in the tyre axial direction of the second ground contact surface 15B is equal to or more than 0.2 times a length L11 in the tyre axial direction of the first shoulder block 15. Thus, sufficient stiffness of the second ground contact surface 15B as well as smooth mud discharging due to deformation thereof can be maintained. In order to further improve the effect, it is preferable that the length L10 in the tyre axial direction of the second ground contact surface 15B is in a range of from 0.5 to 0.8 times the length L11 in the tyre axial direction of the second shoulder block 16.

As illustrated in FIG. 6B, it is preferable that a block height h4 of the second ground contact surface 15B is equal to or less than 1.2 times a block height h3 of the first ground contact surface 15A. Thus, excessive deformation of the second ground contact surface 15B can be prevented so that crack or chipping thereof can be prevented. In order to further improve the effect, the block height h4 of the second ground contact surface 15B is more preferably in a range of from 1.05 to 1.10 times the block height h3 of the first ground contact surface 15A.

It is preferable that a groove depth d2 of the first shallow groove 15C is in a range of from 0.010 to 0.35 times the block height h3 of the first ground contact surface 15A. When the groove depth d2 is less than 0.010 times the block height h3, stiffness of the first shoulder block 15 may be excessive high, deteriorating ground contacting feeling. Further, the second ground contact surface 15B may hardly deform which prevents smooth mud discharging. When the groove depth d2 exceeds 0.35 times the block height h3, stiffness of the first shoulder block 15 may be excessively low. From the above viewpoint, the groove depth d2 of the first shallow groove 15C is in a range of from 0.030 to 0.30 times the block height h3 of the first ground contact surface 15A.

The first shoulder block 15 includes a first block wall 30a extending toward the bottom 11s from the second ground contact surface 15B, and a second block wall 30b extending inwardly in the tyre radial direction from the first ground contact surface 15A. In the present embodiment, the first block wall 30a protrudes outwardly of the first shoulder block 15 from the second block wall 30b. Such a first shoulder block 15 can generate powerful traction on off-road.

In the present embodiment, the at least one first shoulder block 15 includes a plurality of first shoulder blocks 15, and the at least one second shoulder block 16 includes a plurality of second shoulder blocks 16. The number of first shoulder blocks 15 is preferably greater than the number of second shoulder blocks 16. Since the tyre 1 according to the present embodiment is typically directed to off-road traveling, when the number of first shoulder blocks 15 is greater than that of the second shoulder blocks 16, high steering stability on off-road can be maintained.

In order to improve steering stability on off-road and hard road surface conditions in a well-balanced manner, it is preferable that the number of second shoulder blocks 16 is less than 0.5 times the number of first shoulder blocks 15. In the tyre 1 having the first shoulder blocks 15 and the second shoulder blocks 16, the number of second shoulder blocks 16 is more preferably in a range of from 0.10 to 0.40 times the number of first shoulder blocks 15.

It is preferable that the maximum length in the tyre circumferential direction of the second shoulder blocks 16, e.g., corresponding to the length L2, is equal to or less than 2.0 times the maximum length in the tyre circumferential direction of the first shoulder blocks 15, e.g., corresponding to the length L9. When the circumferential maximum length of the second shoulder blocks 16 exceeds 2.0 times the circumferential maximum length of the first shoulder blocks 15, the second shoulder blocks 16 may be difficult to dig deeply into off-road such as muddy road and the like. From the viewpoint, the maximum length in the tyre circumferential direction of the second shoulder blocks 16 is preferably in a range of from 1.2 to 1.8 times the maximum length in the tyre circumferential direction of the first shoulder blocks 15.

The length L5 in the tyre axial direction of each second shoulder block 16, in the present embodiment, is greater than the length L11 in the tyre axial direction of each first shoulder block 15. Such a second shoulder block 16 may have high stiffness in the tyre axial direction, generating powerful lateral force. When the length L5 in the tyre axial direction of each second shoulder block 16 is excessively large with respect to the length L11 in the tyre axial direction of each first shoulder block 15, the second shoulder blocks 16 may be difficult to dig into off-road, resulting in deteriorating steering stability. From the viewpoint, it is preferable that the length L5 in the tyre axial direction of each second shoulder block 16 is equal to or less than 1.30 times the length L11 in the tyre axial direction of each first shoulder block 15. In order to further improve the effect, it is more preferable that the length L5 in the tyre axial direction of each second shoulder block 16 is in a range of from 1.02 to 1.10 times the length L11 in the tyre axial direction of each first shoulder block 15.

As illustrated in FIG. 2, the tread portion 2 according to the present embodiment includes the middle blocks 9 and the crown blocks 10. The middle blocks 9 as well as the crown blocks 10 are arranged in the tyre circumferential direction. The middle blocks 9, in the present embodiment, have respective center of figures located in the middle regions M. The crown blocks 10, in the present embodiment, have respective center of figures located in the crown region Cr. Note that when a ground contact surface of either one of blocks 9 and 10 is provided with one or more recess such as a shallow grooves and the like, the center of figure of the block is determined based on a virtual ground contact surface of the block which is obtained by filling up all the recesses.

Figure 7:
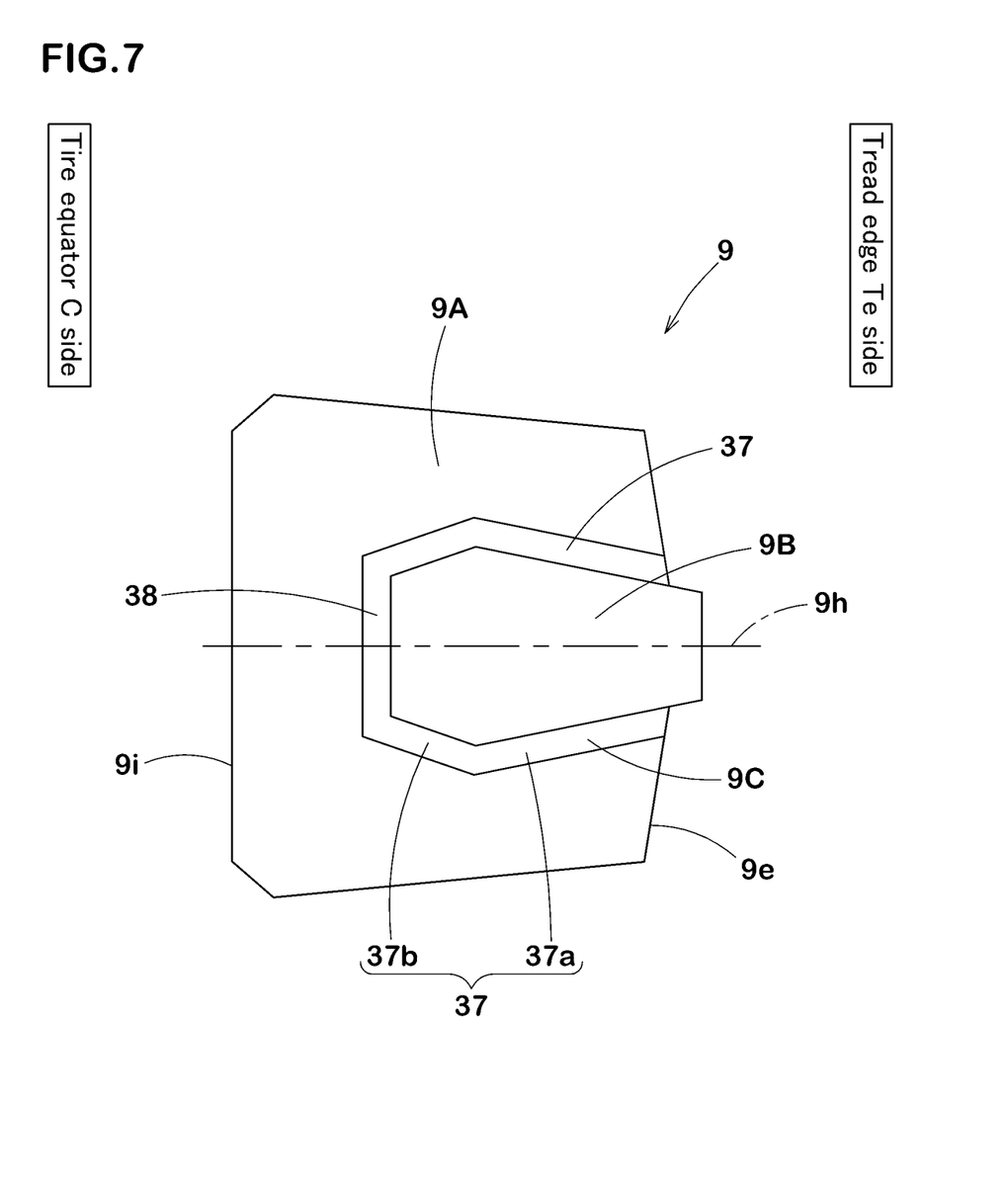
FIG. 7 is an enlarged plan view of a middle block of FIG. 2.

FIG. 7 illustrates a plan view of one of the middle blocks 9. As illustrated in FIG. 7, each middle block 9 according to the present embodiment includes a first middle ground contact surface 9A and a second middle ground contact surface 9B protruding outwardly in a block height direction from the first middle ground contact surface 9A, and a middle shallow groove 9C extending between the first middle ground contact surface 9A and the second middle ground contact surface 9B.

Each middle block 9, for example, includes an axially inner middle block edge 9i extending in the tyre circumferential direction, and an axially outer middle block edge 9e extending in the tyre circumferential direction. Each middle block 9 according to the present embodiment has a line symmetrical shape with respect to a tyre axial line 9h that passes the center location in the tyre circumferential direction of the block. Each middle block 9, in the present embodiment, is configured as a pentagonal shape.

The middle shallow groove 9C includes two middle lateral groove portions 37 extending in the tyre axial direction from the outer middle block edge 9e, and a middle longitudinal groove portion 38 connecting ends of the middle lateral groove portions 37. The first middle ground contact surface 9A, in the present embodiment, is separated from the second middle ground contact surface 9B by the middle lateral groove portions 37 and the middle longitudinal groove portion 38.

Each middle lateral groove portion 37, in the present embodiment, includes a first lateral portion 37a which extends toward the tyre equator C from the outer middle block edge 9e while inclining toward outwardly in the tyre circumferential direction of the middle block 9. and a second lateral portion 37b which is connected to the first lateral portion 37a with an opposite inclination to that of the first lateral portion 37a. Each middle lateral groove portion 37, for example, has a constant groove width, wherein the groove width is measured in parallel with the tyre circumferential direction. The middle longitudinal groove portion 38, in the present embodiment, extends straight with a constant groove width, wherein the groove width is measured in parallel with the tyre axial direction. The middle lateral groove portions 37 as such may increase edge lengths in both tyre circumferential and axial directions.

As illustrated in FIG. 2, each middle block 9, in the present embodiment, includes first middle blocks 40 arranged on the tyre equator C side and second middle blocks 41 arranged axially outwardly of the first middle blocks 40. In the present embodiment, the first middle blocks 40 are arranged so as to overlap the second middle blocks 41 in the tyre axial direction. Thus, high pattern stiffness of the middle regions M can be maintained, resulting in better steering stability.

The crown blocks 10, in the present embodiment, include first crown blocks 10A, second crown blocks 10B, and third crown blocks 10C. The first crown blocks 10A are located within the crown region Cr. The second crown blocks 10B are arranged so as to straddle the crown region Cr and one of the middle regions M (the left side in FIG. 2). The third crown blocks 10C are arranged so as to straddle the crown region Cr and the other one of the middle regions M (the right side in FIG. 2). In the present embodiment, at least either one of first crown blocks 10A, second crown blocks 10B, third crown blocks 10C, first middle blocks 40, or second middle blocks 41 is arranged on an arbitrary tyre circumferential line passing in the crown region Cr and the middle regions M.

Each crown block 10 is provided with a circumferentially extending shallow groove 10f. In the present embodiment, the shallow roove 10f is located on the center position in the tyre axial direction of the block. Thus, each crown block 10 is divided into the block pieces 10a. The shallow groove 10f helps to increase an edge length of each crown block 10 in the tyre circumferential direction. It is preferable that the shallow groove 10f has a width Wa in a range of from 5% to 25% of a length LA in the tyre axial direction of the crown block 10 and a depth da (shown in FIG. 1) in a range of from 5% to 50% of a block height ha of the crown block 10.

The first crown blocks 10A are configured as non-shifted block which includes two block pieces 10a arranged in the same location in the tyre circumferential direction, i.e., having no circumferential displacement. The second crown blocks 10B and the third crown blocks 10C are configured as a shifted-block which includes two block pieces 10a each arranged at a different location in the tyre circumferential direction, i.e., having a displacement from one another.

As illustrated in FIG. 1, the tread grooves 11 according to the present embodiment are provided with one or more tie-bars 12 which raise bottom thereof to connect two blocks. The tie-bars 12 helps to enhance stiffness of blocks, increasing shearing force on off-road as well as friction force on hard road surface conditions. In the present embodiment, as illustrated in FIG. 2, the tie-bars 12 include shoulder tie-bars 12A which connect one of the shoulder blocks 8 and one of the middle blocks 9, and middle tie-bars 12B which connect one of the middle blocks 9 and one of the crown blocks 10.

While the particularly preferable embodiments in accordance with the present disclosure have been described in detail, the present disclosure is not limited to the illustrated embodiments, but can be modified and carried out in various aspects.

Example

Motorcycle pneumatic tyres having a basic structure shown in FIG. 1 and a basic tread pattern of FIG. 2 were prototyped based on the details shown in Table 1. Then, driving performance of each test tyre was tested. The common specification of the test tyres and the test procedure are as follows:

tyre size: 80/100-21 (front), 120/90-19 (rear);
rim size: 1.60×21 (front), 2.15×19 (rear);
tyre inner pressure: 80 kPa;
ratio $h1/dt=0.02$ (Ex. 1 to Ex. 4);
ratio $W4/L5=0.21$ (Ex. 1 to Ex. 4);
ratio $W3/W4=1.4$ (Ex. 1 to Ex. 4);
ratio $L5/TW=0.15$ (Ex. 1 to Ex. 4);
ratio $L2/L9=1.4$ (Ex. 1 to Ex. 4);
ratio $L5/L11=1.08$ (Ex. 1 to Ex. 4)
ratio $L6/L5=0.64$ (Ex. 1 to Ex. 4);
ratio $h2/h1=1.06$ (Ex. 1 to Ex. 4); and
ratio $d1/h1=0.09$ (Ex. 1 to Ex. 4).

In Ref. 1, no second shoulder block is provided. Note that the references "N1" and "N2" in Table 1 represent the number of first shoulder block and the number of second shoulder blocks, respectively.

Road adaptability, sliding controllability, and cornering traction performance test:

A test rider rode a motocross bike having displacement of 450 cc and equipped with the respective test tyres on off-road test course which includes a muddy road part and a compressed soil part having a hard road surface, and then evaluated road adaptability, sliding controllability and cornering traction performance based on the rider's sense. The road adaptability means comprehensive steering stability on both hard road surface and muddy road. The sliding controllability means driving controllability when sliding on off-road. The cornering traction means driving stability on both hard road surface and muddy road. The test results are shown in 10-grade evaluation where 10 is the best. The test results are shown in Table 1.

TABLE 1

|  | Ref | Ex. 1 | Ex. 2 | Ex. 3 | Ex. 4 |
| --- | --- | --- | --- | --- | --- |
| N2/N1 (%) | — | 20 | 20 | 20 | 40 |
| L2/Dt (%) | — | 0.05 | 0.08 | 0.05 | 0.05 |
| L1/L2 (%) | — | 0.96 | 0.96 | 0.78 | 0.96 |
| Road adaptability [10-grade evaluation, larger is better] | 5 | 10 | 8 | 8 | 9 |
| Sliding controllability [10-grade evaluation, larger is better] | 5 | 10 | 9 | 8 | 9 |
| Cornering traction [10-grade evaluation, larger is better] | 5 | 10 | 8 | 8 | 9 |
| Total point [21 or more is better] | 15 | 30 | 25 | 24 | 27 |

From the rest results, it is confirmed that example tyres, as compared to the comparative example tyre, improve steering stability on both off-road and hard road surface conditions in a well-balanced manner. Further, the same test results were confirmed when the present disclosure was embodied as heavy-duty tyres as well as tyres different in size.

What is claimed is:

1. An off-road tyre comprising
a tread portion being provided on a tread edge side with shoulder blocks arranged in a tyre circumferential direction, the shoulder blocks comprising at least one first shoulder block and at least one second shoulder block having a circumferential length greater than that of the at least one first shoulder block, wherein
the at least one first shoulder block comprises a first ground contact surface, a second ground contact surface protruding outwardly from the first ground contact surface in a block height direction, and a first shallow groove extending between the first ground contact surface and the second ground contact surface,
the at least one second shoulder block comprises a third ground contact surface, a fourth ground contact surface protruding outwardly from the third ground contact surface in a block height direction, and a second shallow groove extending between the third ground contact surface and the fourth ground contact surface,
the at least one second shoulder block comprises a circumferentially extending axially inner block edge,
the second shallow groove comprises two lateral groove portions extending outwardly in a tyre axial direction from the inner block edge and a longitudinal groove portion connecting axially outer ends of the lateral groove portions, and
each of the lateral groove portions of the at least one second shoulder block comprises a first portion extending from the inner block edge, and a second portion connected to the first portion and having a greater width than that of the first portion.

2. The off-road tyre according to claim 1, wherein
the at least one second shoulder block comprises a circumferentially extending axially outer block edge, and
a length in the tyre circumferential direction of the inner block edge is smaller than a length in the tyre circumferential direction of the outer block edge.

3. The off-road tyre according to claim 1, wherein
in the at least one second shoulder block, the third ground contact surface is defined outside in the tyre circumferential and axial directions of the second shallow groove, and
block widths of portions of the third ground contact surface which are adjacent to the second portions of the lateral groove portions in the tyre circumferential direction are greater than a block width of a portion of the third ground contact surface which is adjacent to the longitudinal groove portion in the tyre axial direction, but are equal to or less than 3.0 times the block width of a portion of the third ground contact surface which is adjacent to the longitudinal groove portion in the tyre axial direction.

4. The off-road tyre according to claim 1, wherein
in the at least one second shoulder block, the fourth ground contact surface is defined inside in the tyre circumferential and axial directions of the second shallow groove, and
the inner block edge of the fourth ground contact surface extends in parallel with the tyre circumferential direction.

5. The off-road tyre according to claim 1, wherein
in the at least one second shoulder block, the third ground contact surface is defined outside in the tyre circumferential and axial directions of the second shallow groove, and
a block width of a portion of the third ground contact surface which is adjacent to the longitudinal groove portion in the tyre axial direction is in a range of from 0.1 to 0.4 times an axial length of the second shoulder block.

6. The off-road tyre according to claim 1, wherein a length in a tyre axial direction of the fourth ground contact surface is equal to or more than 0.2 times a length in the tyre axial direction of the second shoulder block.

7. The off-road tyre according to claim 1, wherein a block height of the fourth ground contact surface is equal to or less than 1.2 times a block height of the third ground contact surface.

8. The off-road tyre according to claim 1, wherein a groove depth of the second shallow groove is in a range of from 0.010 to 0.35 times a block height of the third ground contact surface.

9. The off-road tyre according to claim 1, wherein a number of the at least one first shoulder block is greater than a number of the at least one second shoulder block.

10. The off-road tyre according to claim 9, wherein a number of the at least one second shoulder block is less than 0.5 times a number of the at least one first shoulder block.

11. The off-road tyre according to claim 1, wherein a length in the tyre circumferential direction of the at least one second shoulder block is equal to or less than 2.0 times a length in the tyre circumferential direction of the at least one first shoulder block.

12. The off-road tyre according to claim 1, wherein a length in a tyre axial direction of the at least one second shoulder block is greater than a length in a tyre axial direction of the at least one first shoulder block, but is equal to or less than 1.30 times the length in a tyre axial direction of the at least one first shoulder block.

13. The off-road tyre according to claim 2, wherein
in the at least one second shoulder block, the fourth ground contact surface is defined inside in the tyre circumferential and axial directions of the second shallow groove, and
the inner block edge of the fourth ground contact surface extends in parallel with the tyre circumferential direction.

14. The off-road tyre according to claim 2, wherein
in the at least one second shoulder block, the third ground contact surface is defined outside in the tyre circumferential and axial directions of the second shallow groove, and
a block width of a portion of the third ground contact surface which is adjacent to the longitudinal groove portion in the tyre axial direction is in a range of from 0.1 to 0.4 times an axial length of the second shoulder block.

* * * * *